(12) United States Patent
Katou et al.

(10) Patent No.: US 9,713,991 B2
(45) Date of Patent: Jul. 25, 2017

(54) WIRE HARNESS ROUTING STRUCTURE

(71) Applicant: SUMITOMO WIRING SYSTEMS, LTD., Mie (JP)

(72) Inventors: Shinji Katou, Mie (JP); Yoshikazu Sakakibara, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 15/031,859

(22) PCT Filed: Nov. 4, 2014

(86) PCT No.: PCT/JP2014/079169
§ 371 (c)(1),
(2) Date: Apr. 25, 2016

(87) PCT Pub. No.: WO2015/072362
PCT Pub. Date: May 21, 2015

(65) Prior Publication Data
US 2016/0264073 A1    Sep. 15, 2016

(30) Foreign Application Priority Data

Nov. 15, 2013  (JP) .................................. 2013-236455

(51) Int. Cl.
*B60R 16/02*   (2006.01)
*H02G 3/04*    (2006.01)
(Continued)

(52) U.S. Cl.
CPC ........ *B60R 16/0215* (2013.01); *B60R 16/027* (2013.01); *H01B 7/0045* (2013.01);
(Continued)

(58) Field of Classification Search
CPC . B60R 16/0215; H01B 7/0045; H02G 3/0406
(Continued)

(56) References Cited

U.S. PATENT DOCUMENTS

2003/0213607 A1* 11/2003 Katsumata ........... H02G 3/0487
                                                                174/68.3
2008/0017397 A1*  1/2008 Komiya .................. F16G 13/16
                                                                 174/24
2008/0210828 A1*  9/2008 Kogure ................ H02G 11/006
                                                                 248/65

FOREIGN PATENT DOCUMENTS

JP    2003-220901    8/2003
JP    2006-036154    2/2006
(Continued)

OTHER PUBLICATIONS

Search Report issued by PCT/JP2014/079169 patent office in PCT/JP2014/079169 Patent Application No., dated Feb. 17, 2015.

*Primary Examiner* — Timothy Thompson
*Assistant Examiner* — Charles Pizzuto
(74) *Attorney, Agent, or Firm* — Greenblum & Bernstein, P.L.C.

(57) ABSTRACT

A wire harness is routed from a luggage compartment of an automobile along a hinge arm and toward a luggage door. An extra wire length accommodation case is positioned between the hinge arm and a vehicle body panel of the luggage compartment in a vertical direction which is an operation direction of the hinge arm. The extra wire length accommodation case has a shape that includes an arced wire entrance having a wire harness outlet linked with an arced portion of the hinge arm, and an extra wire length bypass continuous with the arced wire entrance. The wire harness is passed into the extra wire length bypass of the extra wire length accommodation case, then is drawn out through the outlet of the arced wire entrance and routed along the arced portion of the hinge arm toward the luggage door.

4 Claims, 6 Drawing Sheets

(51) Int. Cl.
*H01B 7/00* (2006.01)
*B60R 16/027* (2006.01)
*H02G 11/00* (2006.01)

(52) U.S. Cl.
CPC ......... *H02G 3/0406* (2013.01); *H02G 3/0487* (2013.01); *H02G 11/00* (2013.01)

(58) Field of Classification Search
USPC ..................................................... 174/72 A
See application file for complete search history.

(56) References Cited

FOREIGN PATENT DOCUMENTS

| | | |
|---|---|---|
| JP | 2008-025775 | 2/2008 |
| JP | 2008-220012 | 9/2008 |
| JP | 2010-264785 | 11/2010 |
| JP | 2012-085473 | 4/2012 |
| JP | 2014-184838 | 10/2014 |

* cited by examiner

WIRE HARNESS ROUTING STRUCTURE

FIELD OF THE INVENTION

The present invention relates to a wire harness routing structure. Specifically, the present invention enables a wire harness routed from a luggage compartment of an automobile into a luggage door to smoothly follow an open/close action of the luggage door.

BACKGROUND OF THE INVENTION

An example of this kind of wire harness routing structure routing a wire harness into a luggage door of a luggage compartment (cargo bay) provided to a rear portion of an automobile is Japanese Patent Laid-open Publication No. 2012-85473 (Patent Literature 1), in which the present applicants provide a protector 110 preventing water that adheres to the wire harness 200 when a luggage door 100 is opened from infiltrating a luggage compartment 101, as shown in FIGS. 6A and 6B.

In the routing of the wire harness 200 into the luggage door 100 according to Patent Literature 1, the protector 110 is fixated to an arm 105, which connects the luggage door 100 and the luggage compartment 101, on a compartment-side surface 105s in a left/right width direction S of the arm 105. The wire harness 200 is inserted into the protector 110.

The wire harness 200 is inserted from the luggage compartment 101 side into the protector 110, which is fixated to the compartment-side surface 105s of the arm. As shown in FIGS. 7A and 7B, the wire harness 200 is then drawn into the luggage compartment 101 from a harness outlet provided to a vehicle body panel separating the luggage compartment 101 from a rear portion of a vehicle interior, and the wire harness 200 is routed from the harness outlet to the protector 110 across the left/right width direction S.

RELATED ART

Patent Literature

Patent Literature 1: Japanese Patent Laid-open Publication No. 2012-85473

SUMMARY OF THE INVENTION

Problems to be Solved by the Invention

As shown in FIGS. 7A and 7B, the protector 110 and the harness outlet 121 are provided close to each other so as not to narrow an effective volume within the luggage compartment 101, and a width of a gap between the protector 110 and the harness outlet 121 is narrowed. The wire harness 200 is routed across this narrow gap and must follow the open/close operation of the luggage door 100. The wire harness 200 is in an extended state when the luggage door 100 is open, as shown in FIG. 7A, and an extra length 200e of the wire harness is in a bent state when the luggage door 100 is closed, as shown in FIG. 7B.

As noted above, when the luggage door 100 is closed, the extra length 200e of the wire harness 200 bends in the narrow gap, and therefore there is a large change in curvature when bending and the curvature is unstable. Accordingly, wires having excellent bend resistance are used as the wires configuring the wire harness 200. Such bend-resistant wires have a higher price in comparison to generic wires.

The present invention has been conceived in light of the circumstances above. In the present invention, a wire harness that follows opening and closing of a luggage door experiences increased bending as compared to the conventional example described above, and curvature is also more stabilized. Accordingly, the present invention can utilize generic wires rather than expensive, bend-resistant wires, reducing costs.

Means for Solving the Problems

In order to resolve the above-noted circumstances, the present invention provides a wire harness routing structure routing a wire harness from a luggage compartment of an automobile along a U-shaped hinge arm and toward a luggage door. An extra wire length accommodation case is positioned in a gap between a left/right width direction exterior surface of the hinge arm and an exterior panel of a vehicle body panel encompassing the luggage compartment in a vertical direction which is an operation direction of the hinge arm, and is installed fixated to the exterior panel of the vehicle body panel. The extra wire length accommodation case is configured by a single case configured by a main body and a lid. The case includes an arced wire entrance having a wire harness outlet linked with an arced portion of the hinge arm, and an extra wire length bypass continuous with the arced wire entrance. The arced wire entrance matches an arc of the hinge arm. The wire harness is passed from the luggage compartment side into the extra wire length bypass of the extra wire length accommodation case and is U-turned, then is inserted into the arced wire entrance in an arced shape and drawn out through the outlet of the arced wire entrance, and the extracted wire harness is routed along the arced portion of the hinge arm toward the luggage door.

The extra wire length bypass of the extra wire length accommodation case has a large surface area causing the wire harness to make a U-turn, and the arced wire entrance has a small surface area where the wire harness is inserted in an arced form.

A top end of the hinge arm is fixated to the luggage door, whereas a bottom portion of the hinge arm is drawn out from an opening in a surface cosmetic material of a floor plate of the luggage compartment, and the hinge arm retracts through the opening in response to the opening and closing of the luggage door. The extra wire length accommodation case is arranged in a position touching an exterior lateral surface of the hinge arm, which is positioned below the surface cosmetic material when the luggage door is closed. The arc of the arced wire entrance matches the arc of the hinge arm touching it. The wire harness is able to span smoothly from the arced outlet to an interior circumferential surface of the arced portion of the hinge arm. In addition, preferably, the wire harness passes through a slider movably mounted at the outlet, which is provided along the entire length of the arced wire entrance, and the wire harness passes through the slider to span from the extra wire length accommodation case to the hinge arm.

In other words, the arc of the arced wire entrance of the extra wire length accommodation case matches the arc of the hinge arm touching it, the wire harness is drawn out through the slider slidably mounted at the outlet provided along the entire length of the arced wire entrance, and the wire harness lies along the arced portion of the hinge arm.

As noted above, the wire harness, which repeatedly bends and stretches in response to the open/close action of the luggage door, passes through the interior of the extra wire length accommodation case and is U-turned by the extra wire length bypass, which is configured with a large surface area. Therefore, bending with a small curvature can be prevented and the wire harness can be bent at a fixed curvature matching the shape of the extra wire length bypass. Conventionally, a curvature radius of the wire harness when bending is approximately 10 centimeters, whereas in the present invention the curvature radius can be increased to between 30 and 50 centimeters. Moreover, a length direction of the extra wire length accommodation case is arranged not in the width direction of the luggage compartment, but rather in the vertical direction alongside the arced portion in the vertical direction of the hinge arm. Accordingly, even when the gap between the hinge arm and the wire harness inlet opening in the luggage compartment is narrow, a large curvature can be imparted to the wire harness, which bends in the vertical direction within the extra wire length accommodation case provided in the vertical direction orthogonal to the width direction, and the wire harness can be bent without difficulty. As a result, generic wires can be used as the wires of the wire harness, rather than wires having excellent bend resistance, and the cost of wires can be reduced.

The wire harness inserted into the extra wire length accommodation case and routed alongside the hinge arm is preferably sheathed by a bendable caterpillar (registered trademark)-type protector. A caterpillar-type protector appropriate for use is a caterpillar-type protector provided with length direction bend lines and width direction slits in a belt-shaped sheet that is extrusion processed or injection molded, and assembled as a bendable tubular body by folding the belt-shaped sheet, as described in Japanese Patent Laid-open Publication No. 2008-25775 or Japanese Application No. 2013-183927.

As described above, when the wire harness is sheathed by the caterpillar-type protector, there is no need to attach a separate protector to the hinge arm and insert the wire harness, enabling work efficiency and reduction of costs.

Generic wires, rather than bend-resistant wires, are used as the wires configuring the wire harness. As described above, the wires of the wire harness routed to the luggage door are not bent at a low curvature and can be given a constant curvature. Therefore, there is no need to use bend-resistant wires and low-cost generic wires can be used instead.

Effect of the Invention

As described above, the wire harness routed from the luggage compartment, along the hinge arm, and to the luggage door is routed to the hinge arm through the extra wire length accommodation case, which is provided in a vertical direction at a position along a lower side surface of the hinge arm, and the wire harness is bent within the extra wire length accommodation case. Therefore, the curvature when bending can be increased and the curvature can be kept constant by the shape of the extra wire length accommodation case. In this way, the curvature of the wire harness when bending is increased and stabilized, with almost no changes in curvature. Therefore, generic wires can be used instead of bend-resistant wires. As a result, the cost of the wire harness can be reduced to between ½ and ⅓. Moreover, the wire harness is not routed and does not bend in the width direction inside the luggage compartment, and therefore loading space within the luggage compartment can be increased.

BRIEF DESCRIPTION OF THE DRAWINGS

FIG. 5A is a perspective view of a state where the wire harness is sheathed by the protector and FIG. 5B is a development view of the protector.

MODE FOR CARRYING OUT THE INVENTION

Figure 1:
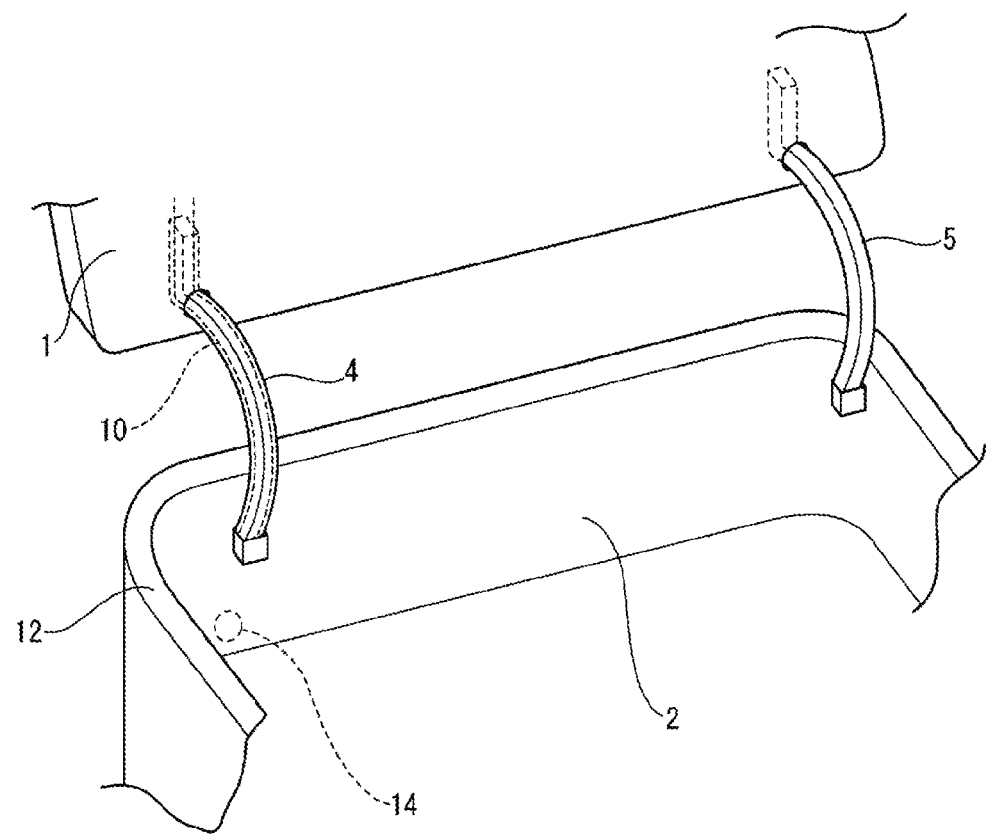
FIG. 1 is a perspective view of an open state of a luggage door to which a wire harness is routed according to an embodiment of the present invention.
Figure 2:
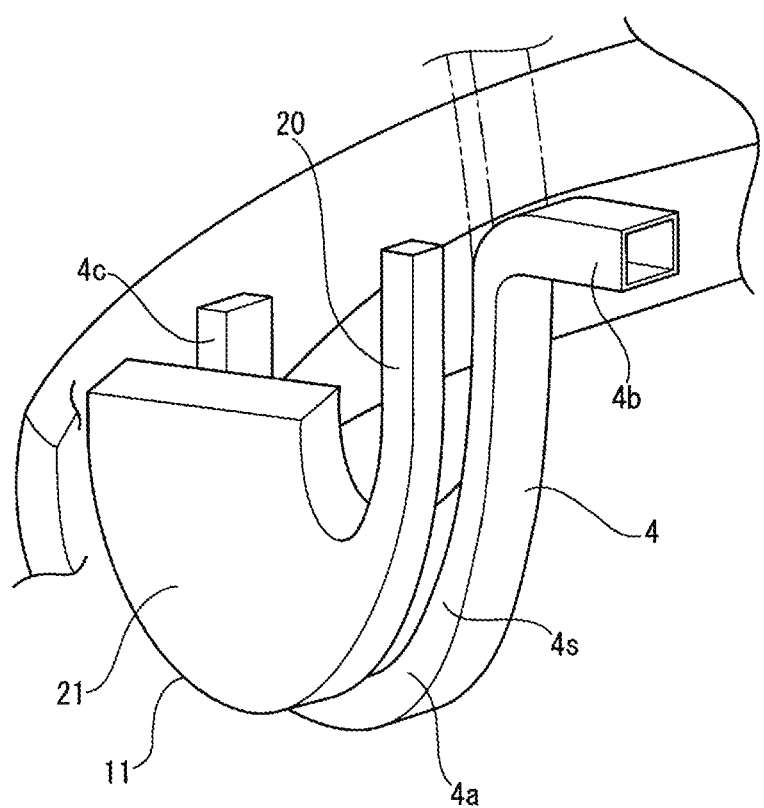
FIG. 2 is a perspective view illustrating a relationship between a hinge arm and an extra wire length accommodation case through which the wire harness is inserted.
Figure 3A:
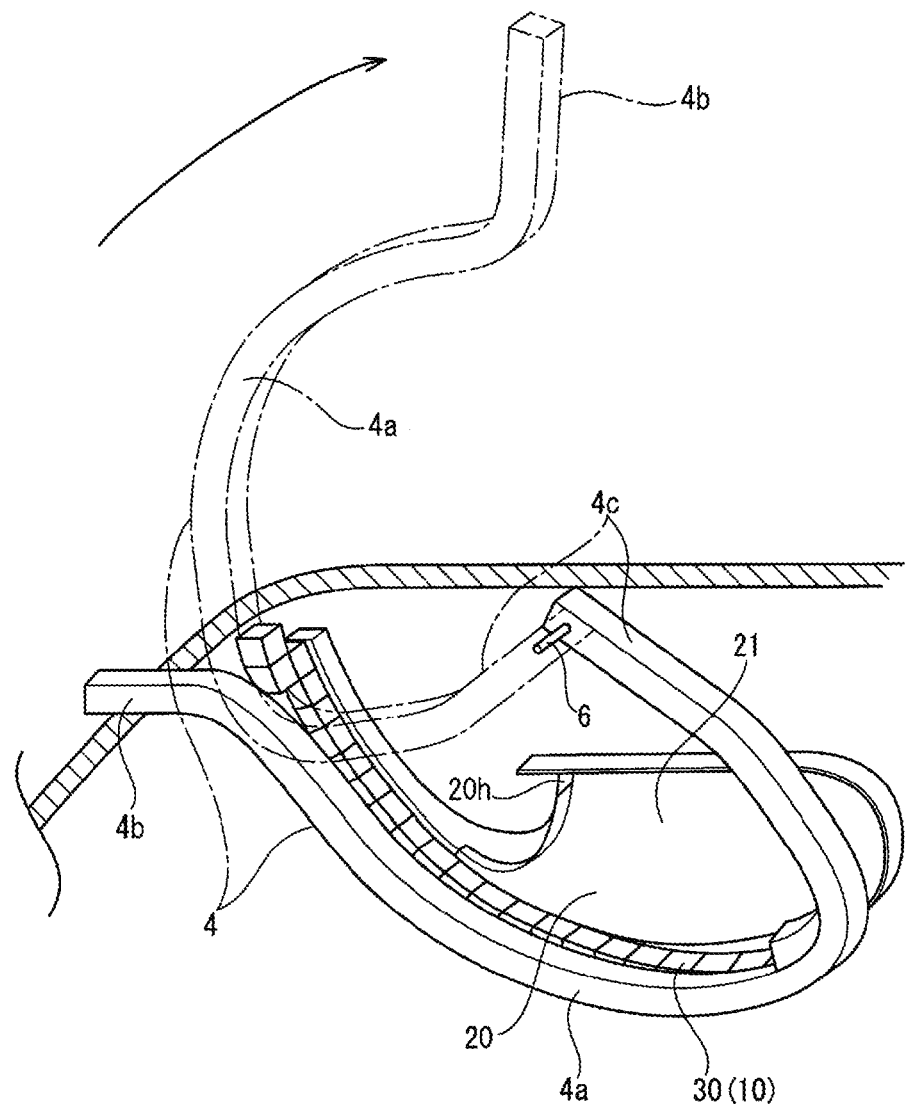
FIG. 3A is a perspective view illustrating an operation of the hinge arm when opening and closing the luggage door.
Figure 3B:
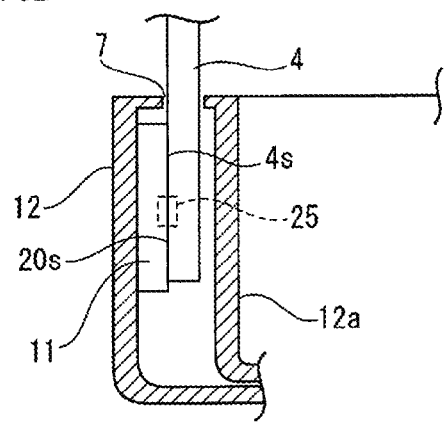
FIG. 3B is a schematic view illustrating a relationship between the hinge arm, the extra wire length accommodation case, and an outer wall of a luggage compartment.

Hereafter, an embodiment of the present invention is described with reference to the drawings. FIGS. 1 through 5B illustrate an embodiment of the present invention. As in FIG. 6B, a wire harness 10 is routed along a hinge arm 4 from a luggage compartment 2 on an interior surface of a luggage door 1, which opens and closes the luggage compartment 2 of an automobile, and the wire harness 10 supplies power to electric components mounted in the luggage door 1. A plurality of wires 3 configuring the wire harness 10 are low-priced generic wires, rather than expensive bend-resistant wires.

The luggage door 1 and the luggage compartment 2 are coupled via a pair of left and right U-shaped hinge arms 4 and 5, and when the luggage door 1 is open, the hinge arms 4 and 5 appear on both the left and right sides. Of the pair of left and right hinge arms, the wire harness 10 is routed along an inner circumferential surface of one hinge arm 4.

The hinge arm 4 has a quadrangular frame cross-section and, as shown in FIGS. 3A-4B, bends in an arced shape in the vertical direction. A length-direction center arced portion 4a is provided, at a top end, with an attachment portion 4b having a straight line shape toward the luggage door 1 and, at a bottom end, with an attachment portion 4c having a straight line shape toward the luggage compartment. The attachment portion 4b at the top end of the hinge arm 4 is fixated to a bottom end of the luggage door 1, and the attachment portion 4c at the bottom end of the hinge arm 4 is rotatably supported, via a support pin 6, on a vehicle body panel configuring the luggage compartment. The hinge arm 5 has a similar shape and is attached similarly.

An extra wire length accommodation case 11, into which the wire harness 10 is inserted, is provided in a narrow space between an exterior lateral surface 4s of the hinge arm 4 and the vehicle body panel 12 encompassing the luggage compartment 2. The extra wire length accommodation case 11 is positioned such that a length direction of the extra wire length accommodation case 11 is oriented in the vertical direction (movement direction of the hinge arm 4), and is fixated to the vehicle body panel 12. The extra wire length accommodation case 11 is provided between the vehicle body panel 12 and a surface cosmetic material 12a provided on a compartment side, such that even when the luggage door 1 is open, the extra wire length accommodation case 11 is not visible.

An opening 7 (shown in FIG. 3B) accommodating retraction of the hinge arm 4 is provided to the surface cosmetic material 12a, adjacent to an installation position of the extra wire length accommodation case 11. Also, an opening 14 (shown in FIG. 1), through which the wire harness 10 is drawn into the luggage compartment 2 from a rear portion of a vehicle interior, is provided at a position near the installation position of the extra wire length accommodation case 11.

Figure 4A:
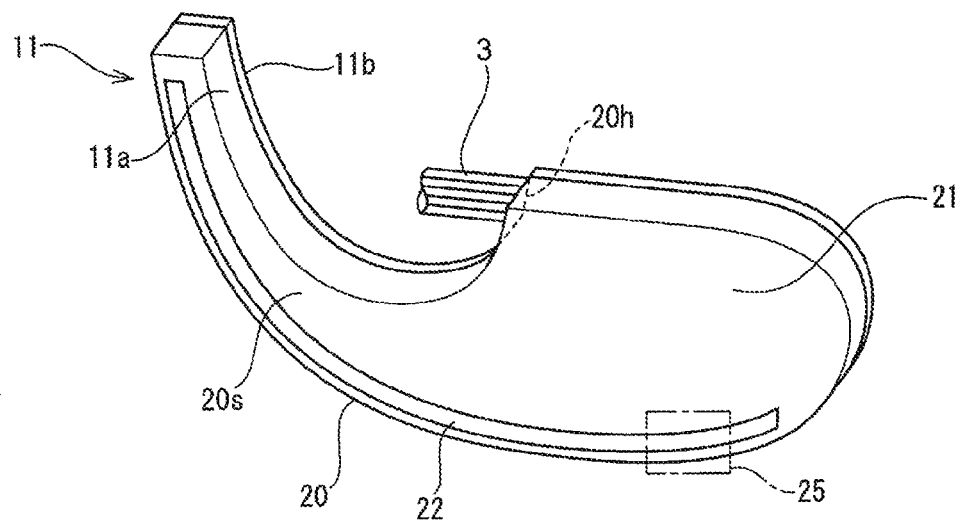
FIG. 4A is a schematic perspective view of the extra wire length accommodation case.
Figure 4B:
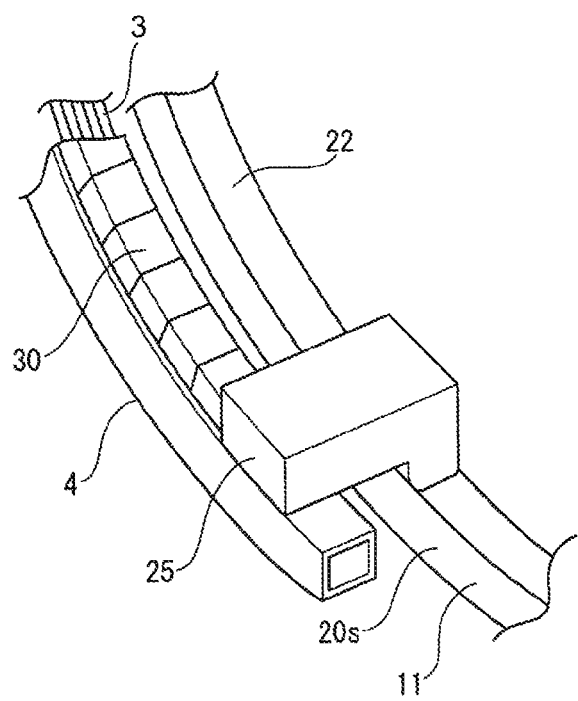
FIG. 4B is an explanatory diagram illustrating a state where the wire harness is continuously routed to the hinge arm from the extra wire length accommodation case.

As shown in FIG. 4A, the extra wire length accommodation case 11 is configured by a shallow-bottomed, molded resin main body 11a into which the wire harness 10 is inserted, after which a lid 11b seals an opening of the main body 11a. The wire accommodation case 11 has a shape that includes an arced wire entrance 20 having a small surface area and curving at substantially the same curvature as the arced portion 4a of the hinge arm 4; and an extra wire length bypass 21 having a large surface area and continuous with the arced wire entrance 20.

An interior lateral surface 20s of the arced wire entrance 20 abuts the exterior lateral surface 4s of the hinge arm 4, and a wire harness outlet 22 is provided along the entire length of the interior lateral surface 20s. A slider 25 is movably mounted along the outlet 22. In addition, a wire harness inlet 20h is provided to a forefront end of the extra wire length bypass 21 on the opposite side from the arced wire entrance 20.

The hinge arm 4 displaces in the vertical direction in response to an open/close action of the luggage door 1, and a portion of the arced portion 4a of the hinge arm 4 makes contact with the interior lateral surface 20s of the arced wire entrance 20 of the extra wire length accommodation case 11. Specifically, when the luggage door 1 is opened, the hinge arm 4 is pulled outward. Therefore, the bottom portion of the arced portion 4a of the hinge arm 4 touches the arced wire entrance 20. Meanwhile, when the luggage door 1 is closed, the hinge arm 4 is pulled toward the luggage compartment 2. Therefore, substantially the entire length of the arced portion 4a touches the arced wire entrance 20.

The wire harness 10, which is pulled into the luggage compartment 2 from the rear vehicle interior side, is pulled through the wire harness inlet 20h of the extra wire length accommodation case 11 and, after being U-turned within the extra wire length bypass 21, passes through the arced wire entrance 20 and is pulled through the slider 25 slidably mounted at the outlet 22 provided to the arced wire entrance 20, to an inner circumferential surface of the arced portion 4a of the hinge arm 4.

Figure 5A:
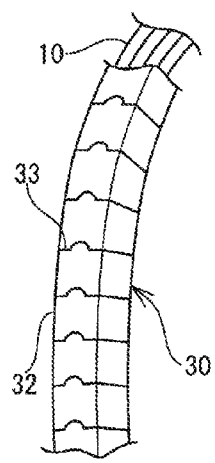
FIGS. 5A and 5B illustrate a protector sheathing the wire harness, where
Figure 5B:
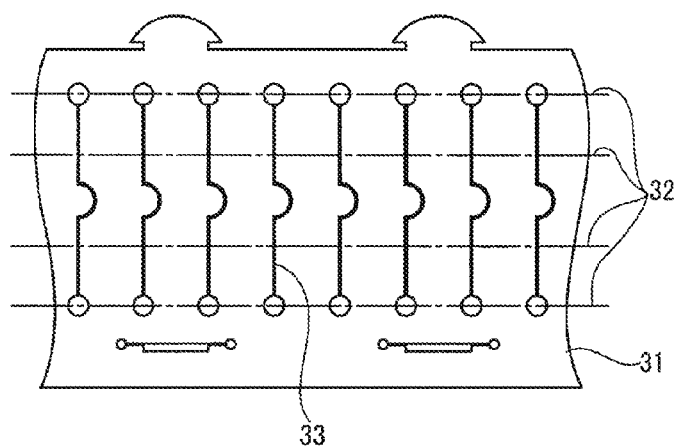
Figure 6A:
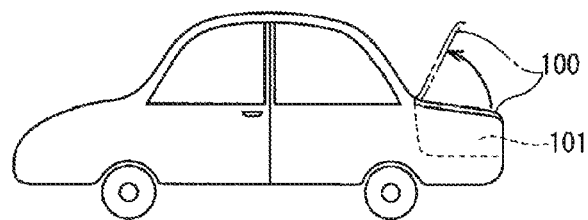
FIGS. 6A and 6B show a conventional example.
Figure 6B:
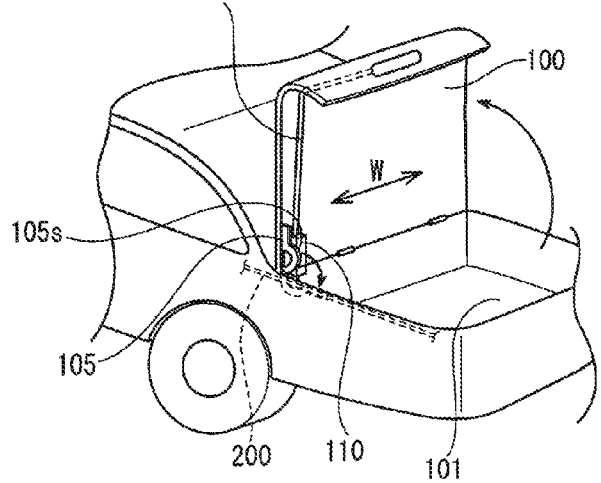
Figure 7A:
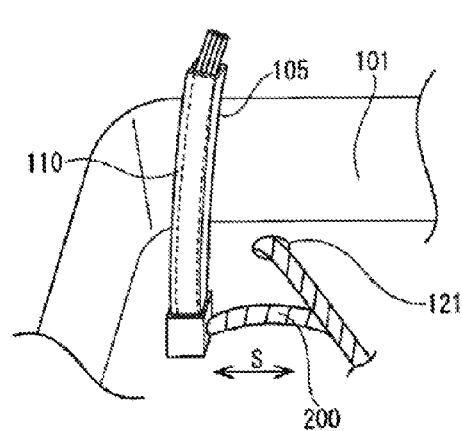
FIGS. 7A and 7B show issues with the conventional example.
Figure 7B:
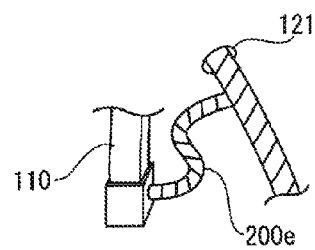

Substantially the entire length of the wire harness 10, which is pulled into the luggage compartment 2 and routed to the luggage door 1, is sheathed by a caterpillar (registered trademark)-type protector 30. As shown in FIGS. 5A and 5B, the protector 30 includes a thin, flat plate 31 having a strip shape, the flat plate 31 including a plurality of bend lines 32 extending in a length direction and provided at intervals in a width direction. The bend lines 32 bend to create a quadrangular cylinder. In addition, slits 33 are cut in the width direction, at intervals in the length direction, such that a first side of the cylinder separates while a second side is continuous, connecting the protector 30 in a state where the first side of the cylinder bends whereas the second side does not bend. When the wire harness 10 is sheathed by the protector 30, the wire harness 10 can be bent at a desired angle. Accordingly, when arranged along an inner circumferential surface of the arced portion 4a of the hinge arm 4, the wire harness 10 can be bent according to the arc of the arced portion 4a and can be routed stably along the hinge arm 4.

Specifically, the wire harness 10 sheathed by the caterpillar-type protector 30 is pulled through the wire harness inlet 20h and inserted into the extra wire length accommodation case 11. In this inserted state, top and bottom surfaces of the protector 30 touch top and bottom surfaces of the extra wire length accommodation case 11 and are displaced stably. After being U-turned through the extra wire length bypass 21 within the extra wire length accommodation case 11, the wire harness 10 passes through the arced wire entrance 20 and is inserted through the slider 25, which is mounted at the outlet 22 provided to the arced wire entrance 20. As described above, the wire harness 10 inserted through the slider 25 is then routed along the inner circumferential surface of the arced portion 4a of the hinge arm 4. In that case, the width of the protector 30 is equal to or less than the width of the hinge arm 4, and the protector 30 is configured so as to not project past the hinge arm 4.

As noted above, the wire harness 10, which repeatedly bends and stretches in response to the open/close action of the luggage door 1, passes through the interior of the extra wire length accommodation case 11 and is U-turned by the extra wire length bypass 21, which is configured with a large surface area. Therefore, bending with a small curvature can be prevented and the wire harness 10 can be bent at a fixed curvature matching the shape of the extra wire length bypass 21. Moreover, the length direction of the extra wire length accommodation case 11 is arranged not in the width direction of the luggage compartment, but rather in the vertical direction alongside the arced portion 4a in the vertical direction of the hinge arm 4. Accordingly, even when the gap between the hinge arm 4 and the wire harness inlet opening 14 in the luggage compartment 2 is narrow, a large curvature can be imparted to the wire harness 10, which bends in the vertical direction within the extra wire length accommodation case 11 provided in the vertical direction orthogonal to the width direction, and the wire harness 10 can be bent without difficulty. As a result, generic wires can be used as the wires 3 of the wire harness 10, rather than wires having excellent bend resistance, and the cost of wires can be reduced.

The present invention is not limited to the above-described embodiment. The wire harness 10 may instead be positioned along the outer circumferential surface of the arced portion 4a of the hinge arm 4 and covered by a cover.

DESCRIPTION OF REFERENCE NUMERALS

1 Luggage door
2 Luggage compartment
4, 5 Hinge arm
4a Arced portion
10 Wire harness
11 Extra wire length accommodation case
20 Arced wire entrance
21 Extra wire length bypass
22 Outlet
25 Slider
30 Caterpillar-type protector

What is claimed is:

1. A wire harness routing structure routing a wire harness from a luggage compartment of an automobile along a U-shaped hinge arm and toward a luggage door, the wire harness routing structure comprising:
an extra wire length accommodation case positioned in a gap between a left/right width direction exterior surface of the hinge arm and an exterior panel of a vehicle body panel encompassing the luggage compartment in a vertical direction which is an operation direction of the hinge arm, and is fixed to the exterior panel of the vehicle body panel,
the extra wire length accommodation case is a single case including a main body, a lid, an arced wire entrance having a wire harness outlet linked with an arced portion of the hinge arm, and an extra wire length bypass continuous with the arced wire entrance, the arced wire entrance matching an arc of the hinge arm, wherein
the wire harness routing structure is configured for passing the wire harness from the luggage compartment side into the extra wire length bypass of the extra wire length accommodation case and U-turning the wire harness, then inserting the wire harness into the arced wire entrance in an arced shape and drawing the wire harness out through the outlet of the arced wire entrance, and routing the extracted wire harness along the arced portion of the hinge arm toward the luggage door.

2. The wire harness routing structure according to claim 1, wherein
the extra wire length bypass of the extra wire length accommodation case has an extra wire length accommodation case surface area configured for U-turning the wire harness, and the arced wire entrance has an arced wire entrance surface area where the wire harness is inserted in an arced form.

3. The wire harness routing structure according to claim 1, wherein
when the wire harness is inserted into the arced wire entrance, the wire harness is drawn out through a slider slidably mounted at the wire harness outlet provided along an entire length of the arced wire entrance of the extra wire length accommodation case, and the wire harness lies along the arced portion of the hinge arm.

4. The wire harness routing structure according to claim 1, wherein when the wire harness is inserted into the extra wire length accommodation case and routed alongside the hinge arm, the wire harness is sheathed by a bendable protector, and the bendable protector is connected in a condition in which a first side of a quadrangular cylinder of the bendable protector bends whereas a second side does not bend and is arranged along an inner circumferential surface of the arced portion of the hinge arm.

* * * * *